United States Patent [19]

Jarman et al.

[11] 4,313,184
[45] Jan. 26, 1982

[54] SONAR SYSTEMS

[75] Inventors: Leonard B. Jarman, Yeovil; Keith M. Allan, Henstridge, both of England

[73] Assignee: Plessey Handel und Investments AG, Zug, Switzerland

[21] Appl. No.: 118,665

[22] Filed: Feb. 5, 1980

[30] Foreign Application Priority Data

Feb. 7, 1979 [GB] United Kingdom ............... 04296/79

[51] Int. Cl.³ ............................................. G01S 15/89
[52] U.S. Cl. .................................. 367/88; 343/5 CM; 367/12
[58] Field of Search ................. 367/88, 12; 343/5 CM

[56] References Cited

U.S. PATENT DOCUMENTS 3,835,448 9/1974 Bertheas ................................ 367/12
3,914,730 10/1975 Jones et al. ............................ 367/88

Primary Examiner—Richard A. Farley
Attorney, Agent, or Firm—Fleit & Jacobson

[57] ABSTRACT

A side scan sonar system comprises a sonar transmitter transducer means for transmitting sonar signal pulses so as to produce an arc of insonification extending to one side of a line along the direction of forward motion of a ship. A line array of receiver transducers for receiving echo signals within the arc is also provided. An electronic scanning beamformer is adapted to combine the signals of the transducers of the line array so as to form a directional receiving beam and to steer the beam electronically through a scanning angle within the arc of insonification. A sampling means is arranged to receive the combined signals of the transducers. A sampling control means is synchronized with the transmitted pulses and is operative to control the sampling means to select signals appertaining to a predetermining sector or strip within the scanning angle. The signals provide information signals for a visual display means.

8 Claims, 18 Drawing Figures

SIDE SCAN PROCESSING UNIT
SYSTEM BLOCK DIAGRAM

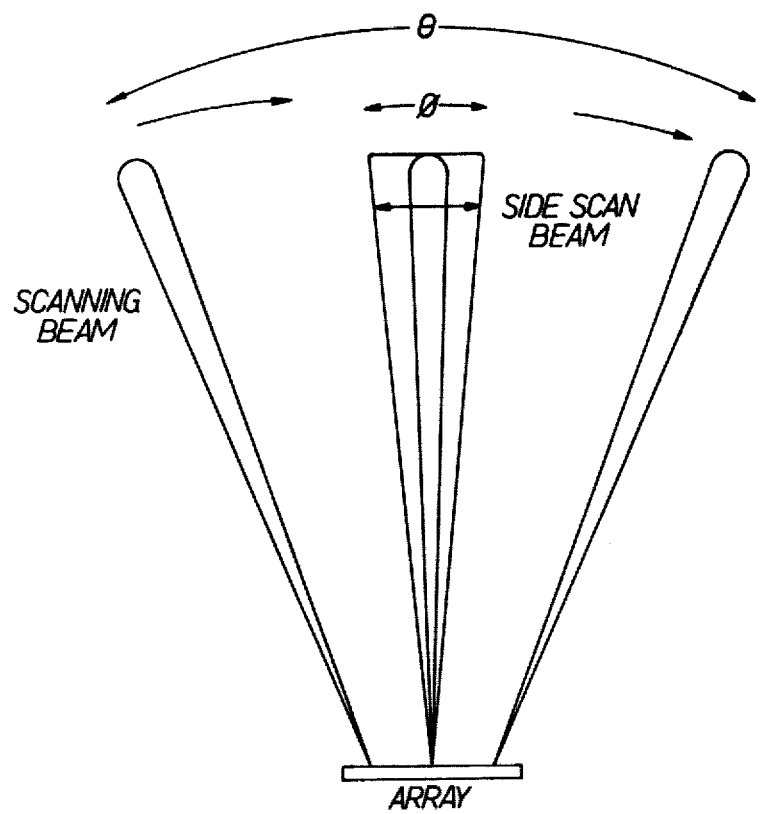
FORMATION OF SIDE SCAN BEAM
FIG./.

2 SAMPLE COVER

3 SAMPLE COVER

EXAMPLES OF MODIFIED BEAM TO ELIMINATE
HOLES AND IMPROVE COVER

TIMING SIGNAL INTERFACE FUNCTION DIAGRAM

RANGE TIMING GENERATOR WAVEFORMS

BEAM FORMER TIMING WAVEFORMS

VIDEO SUMMING & OUTPUT INTERFACE FUNCTION DIAGRAM

RANGE SCAN TIMEBASE AND TEST SIGNAL WAVEFORMS

MARKER TIMING WAVEFORMS

SONAR SYSTEMS

BACKGROUND OF INVENTION

This invention relates to Sonar Systems

Ship borne electronic beam scanning sonar is well known and normally comprises a trainable sonar array arranged electronically to scan in azimuth about the array axis nominally ahead of the ship.

Side scan sonar is also very well known and comprises an array arranged to radiate a narrow beam at 90° to the forward movement of the ship, a sonar presentation in this case being achieved by reason only of the ships movement. In the majority of side scan systems the array is towed behind the ship.

Known side scan sonar systems have several limitations and perhaps the most serious limitation is that the forward speed of the ship would be severely restricted if sensible sonar soundings are to be obtained.

SUMMARY OF THE INVENTION

It is an object of the invention to provide a side scan sonar system which can enable operation with relatively high forward speed of the ship.

According to the present invention a side scan sonar system comprises a sonar transmitter transducer means for transmitting sonar signal pulses so as to produce an arc of insonification extending to one side of a line along the direction of forward motion of a ship, a line array of receiver transducers for receiving echo signals within the arc, an electronic scanning beamformer adapted to combine the signals of the transducers of the line array so as to form a directional receiving beam and to steer the said beam electronically through a scanning angle within the arc of insonification, sampling means arranged to receive the combined signals of the transducers, sampling control means synchronised with the transmitted pulses and operative to control the sampling means to select signals apertaining to a predetemined sector or strip within the scanning angle which signals provide information signals for visual display mens.

By means of controlled sampling, only those video signals which relate to the predetermined sector are fed to the display means and in this way, data relating to any predetermined sector of the insonified arc may be displayed and for example data relating to a parallel strip-like sector may be displayed, as for example on a hard-copy printer, whereby a sonar representation of the seabed extending to one side of the ship may be continuously presented while the ship maintains normal speed. Control of the sampling means may be effected in dependence upon the movement of the ship and/or in dependence upon other variable parameters, such as water temperature which affects the speed of sound in water, whereby good hard copy print out is afforded independently on the forward speed of the ship and whereby other ship's motions may be compensated for at least some extent.

The following description and explanation appertaining to one embodiment of the invention is directed more especially towards a system in which the elements of an array are scanned and sampled repeatedly so that each scan produces video data appertaining to "cells" at substantially the same range which define an arc, data from successive scans which therefore relates to contiguous arcs at progressively increasing ranges being received consecutively to provide from each sonar pulse, data appertaining to the predetermined sector of interest.

It will be appreciated that as an alternative to this scanning system which will hereinafter be described in detail, parallel processing of data could be effected whereby data from a plurality of elements of the array is processed contemporaneously and stored whereby video data appertaining to the sector of interest can be selected from the stored data and fed as required to the display means.

According to one advantageous form of the present invention said scanning beamformer is arranged to steer said beam repeatedly through said scanning angle so that the array is repeated scanned electronically after each sonar pulse so as to provide data signals appertaining to the said sector or strip and so as to complete after the transmission of each sonar pulse a series of scans wherein successive scans relate to progressively increasing ranges, the sampling means being operative to sample echo signals received during a predetermined time slot in each scan, means for determining the bearing of received sonar echos in dependence upon the position of the time slots relative to the start of the scan, and means for determining the received sonar beam width in dependence upon the duration of the time slots thereby to provide information signals, received within the said sector, for visual display means.

The time slots during which the signal sampling means are operative to sample received echo signals may be arranged to be centred on an angular position in the scanned arc which is common for each series of scans.

The width of each time slot may be arranged to vary during each series of scans-so as to provide a predetermined receiver beam pattern.

Thus blind spots, which would not fall within the received beam pattern at normal ship cruising speeds with known side scan sonar systems, may be covered by suitable shaping of the received beam pattern in a system according to the present invention.

The display means may comprise a hard copy display unit in which data received during each range scan is displayed as a line of video modulated grey scale along a range axis one line for each scan, and in which movement, in a direction orthogonal to the range axis, of a substrate on which the display is provided is controlled in dependence upon the forward speed of the ship.

BRIEF DESCRIPTION OF DRAWINGS

An embodiment of the invention will now be described by way of example with reference to the accompanying drawings in which:

FIG. 1, is a diagram showing formation of a side scan beam;

A DESCRIPTION OF THE PREFERRED EMBODIMENT

Figure 2A:
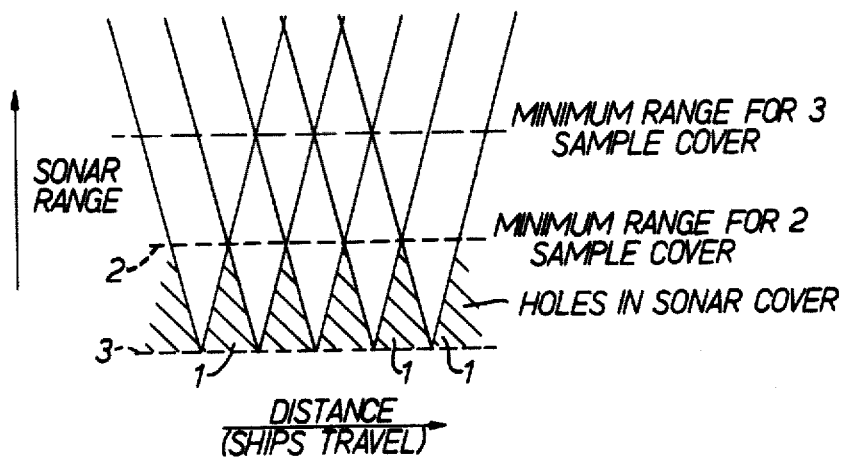
FIG. 2a, is a diagram showing gaps in the coverage of a conventional side scan sonar beam pattern.

A side scan processing unit (SSPU) is a signal processing and recording system which enables sonar systems which operate on an electronic scanning beam principle to function in a side scan mode. The SSPU is a self contained piece of equipment consisting of an electronics unit which performs and controls the side scan process and a line scan recorder which presents the side scan data as a continuous hard copy paper or film recording. The conversion to side scan operation requires no major modifications to the parent sonar. The SSPU requires only three signals from the parent sonar to perform the side scan process these being (a) the transmitted sonar pulse which is used to provide a range timing reference (b) the scanning frequency signal of the parent sonar to provide a bearing reference, and (c) the receiver output signal to provide sonar video data.

Side scan operation is achieved by the ship steaming along a straight course with the sonar transducer positioned at 90° (either to port or starboard) to the direction of travel. The SSPU will thus produce a side scan recording of range against distance travelled.

An SSPU may be designed to provide high definition display resolution. The system is therefore capable of generating side scan recordings to satisfy a number of operational tasks such as, wreckage location, the detection and classification of small objects, pipeline surveying and sonar recordings of the sea bed as required for hydrographic surveying. An SSPU can therefore be effectively employed with commercial scanning sonar systems significantly to extend their operational capabilities.

A system according to the present invention forms in effect a fixed beam from a scanning beam sonar. The concept of forming a fixed beam from a scanning beam sonar relies upon the fact that the receiver beam pattern scans through its completed arc within the transmitted sonar pulse period, a parameter fundamental to electronic scanning sonar systems. This means that signals received from an instantaneous sample of the scanning beam must represent the natural receiver beam pattern response of the sonar.

Referring now to FIG. 1 the period of the scanning frequency is related directly to the scanned arc $\phi$ of the sonar beam. A fixed beam $\phi$ can therefore be formed by sampling at the scan frequency the detected received sonar signals during a sampling period which is synchronized with the scanning frequency. A sampling signal for this task can be derived from the scanning frequency signal by means of suitable time delays such that the sample can occur at any required point in the scanned arc and can be of any duration. It is not practicably possible however instantaneously to sample the receiver video signals and the resultant beam width is therefore given by the equation:

$$\text{beam width} = \text{natural beamwidth} + \frac{\text{sample period} \times \text{scanned arc}}{\text{BEAM SCANNING PERIOD}}$$

As the sampled beam can be positioned at any bearing within the scanned arc, side scan operation is achieved by sampling the scanning beam as it passes through a bearing at substantially 90° to the direction of travel. In its simplest form this is achieved by aligning a stabilised transducer system to a bearing 90° to the direction of forward motion of the ship, the beam being sampled as it passes through the centre of the scanned arc. FIG. 1 shows the formation of the side scan beam. In a more complex system the beam position may be controlled to provide electronic stabilisation to within the limits of the scanned arc for a fixed side looking array system.

Figure 2B:
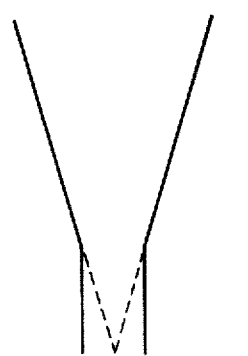
FIG. 2b, is a diagram showing a sonar beam having a pattern suitable to accommodate two samples.
Figure 2C:
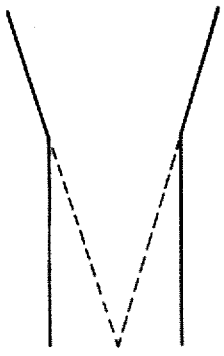
FIG. 2c, is a diagram showing a sonar beam pattern suitable to accommodate three samples.

The ability to vary the beam width of the resultant side scan beam, enables the SSPU to control the beam pattern response to suit various operational requirements. This is a characteristic which offers certain advantages over conventional side scan systems. For high definition side scan operation a narrow beam is required to obtain the optimum display resolution. Although the SSPU cannot realise the absolute beam width of the parent sonar, a very good approximation may be achieved and for practical purposes has a negligible effect on the performance of the system. When conventional known side scan systems are employed, a minimum range limitation occurs due to the combined effect of the narrow beam width, the transmission rate, and the ship's speed. As the ship's speed is increased the distance travelled between transmitted sonar pulses becomes greater than the width covered by the beam, resulting in gaps 1 occuring in the side scan cover, shown as shaded parts in FIG. 2a, producing the minimum range limitation between broken lines 2 and 3 as demonstrated in FIG. 2a. With the beam width control facility available to the SSPU system this does not occur. The side scan beam width control can be programmed in accordance with ships speed and sonar transmission rate, to modify the beam width during the range scan as shown in FIG. 2b and FIG. 2c. The resultant effect is for the beam to remain the same width in terms of distance ensuring that no gaps occur in the sonar coverage. FIG. 2b shows one example of beam width modification with range, in which the beam pattern enables each area covered to be sampled twice whereas FIG. 2c shows an alternative beam pattern which is wide enough to facilitate the taking of three samples. When the operational task is that of detecting small objects as may be required for wreck location, the detection ability of the side scan system may be improved by operating with a wide beam two or three times greater than the natural beam width of the parent sonar. Although this technique tends to destroy the sea bed detail the higher sample rate due to the increased beam width cover enhances the display sonar signals for such objects. To realise the full potential of this variable beam ability, the SSPU employs a selection of beam widths to satisfy various operational tasks.

The system processing functions are shown in the system block diagram FIG. 3 and their operation will now be described.

The system comprises a process control unit 4 which interfaces operator controls with other units in the system and generates command signals and additionally provides scaling factors for various modes of operation. The control functions as indicated in unit 4 of FIG. 3 are referenced A, B, C, D, and E and these letters are placed alongside the other units of the system as appropriate to indicate the control function provided from the control unit 4.

Figure 6:
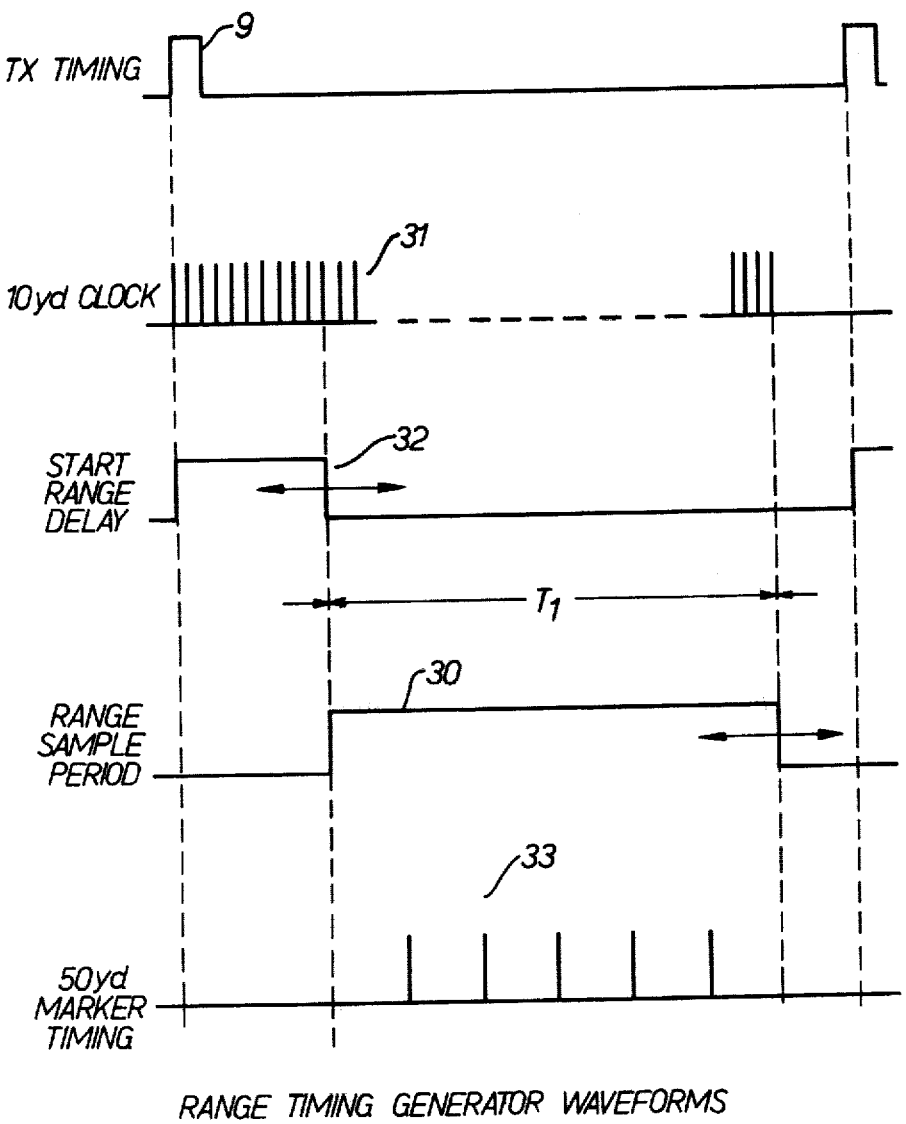
FIG. 6, is a waveform diagram showing waveforms; associated with the range timing generator of FIG. 5.

The system is designed to accept timing data from a parent sonar either in analogue form or in digital form and this is fed on lines 5 and 6 to a timing signal interface unit 7 which converts this data into a standard digital format for use by the other units of the system. A secondary task performed by this unit is to interface record and play back timing signals supplied on line 8 for operation with the tape recorder. Two output signals are provided by the unit 7, transmit timing pulses 9 as shown in FIG. 6 which are fed to a range timing generator 12 on line 10 and scan pulses 11 shown in FIGS. 7 and 8 which are synchronized with the scanning frequency of the parent sonar and fed on line 13 to the timing generator 12 and on line 14 to a beam former timing unit 15.

Figure 3A:
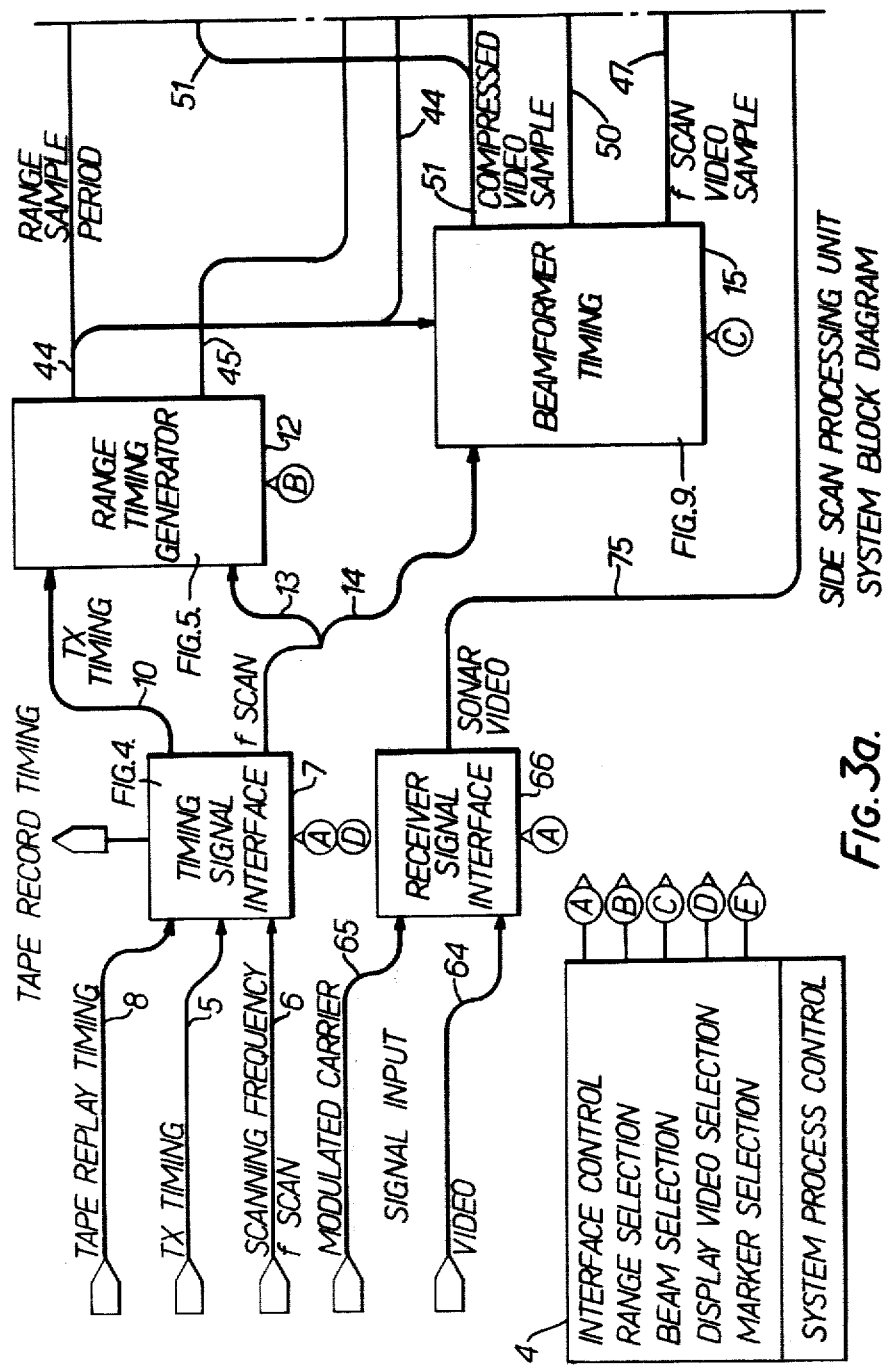
FIGS. 3a and 3b are block schematic diagrams of a side scan processing system.
Figure 3B:
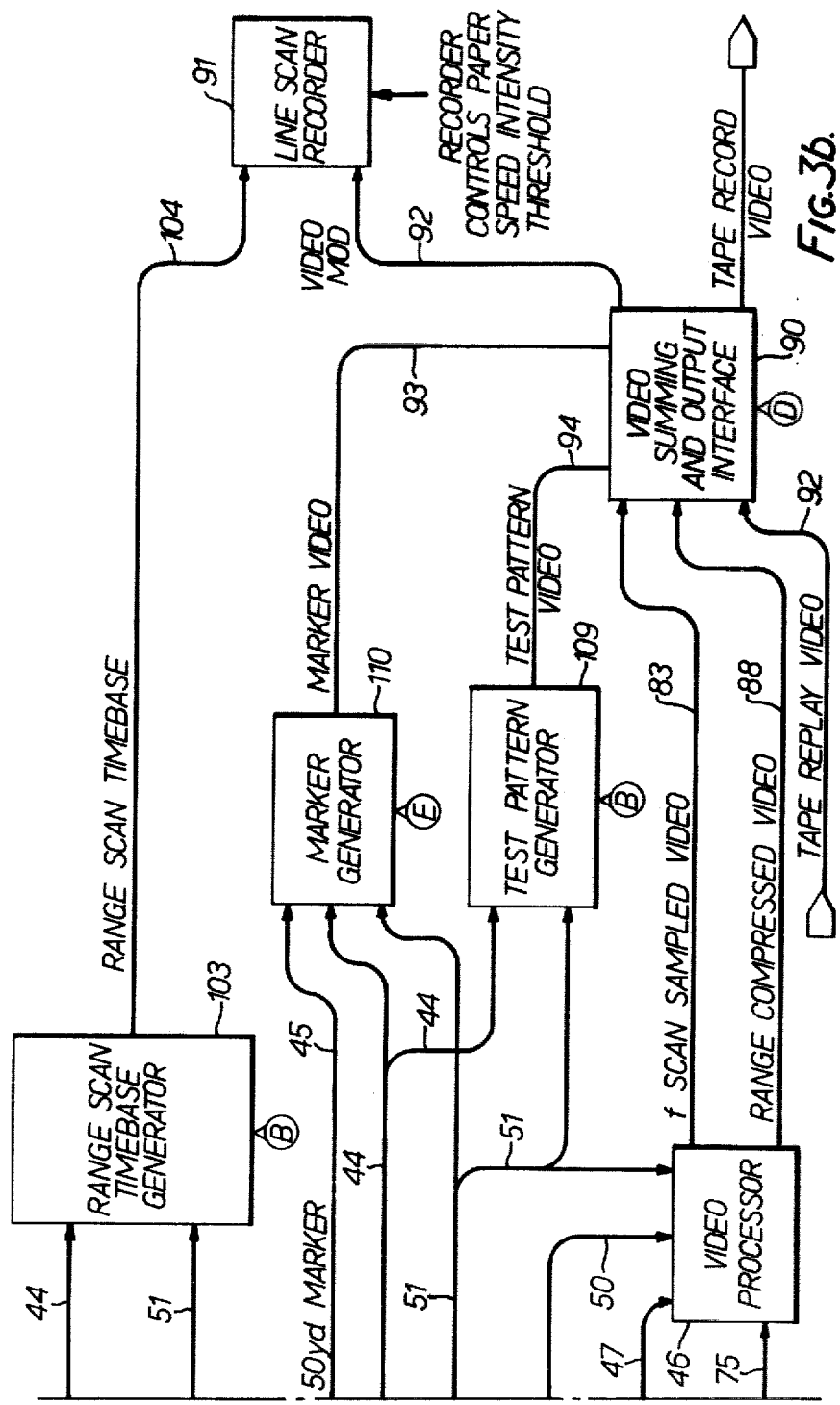
Figure 4:
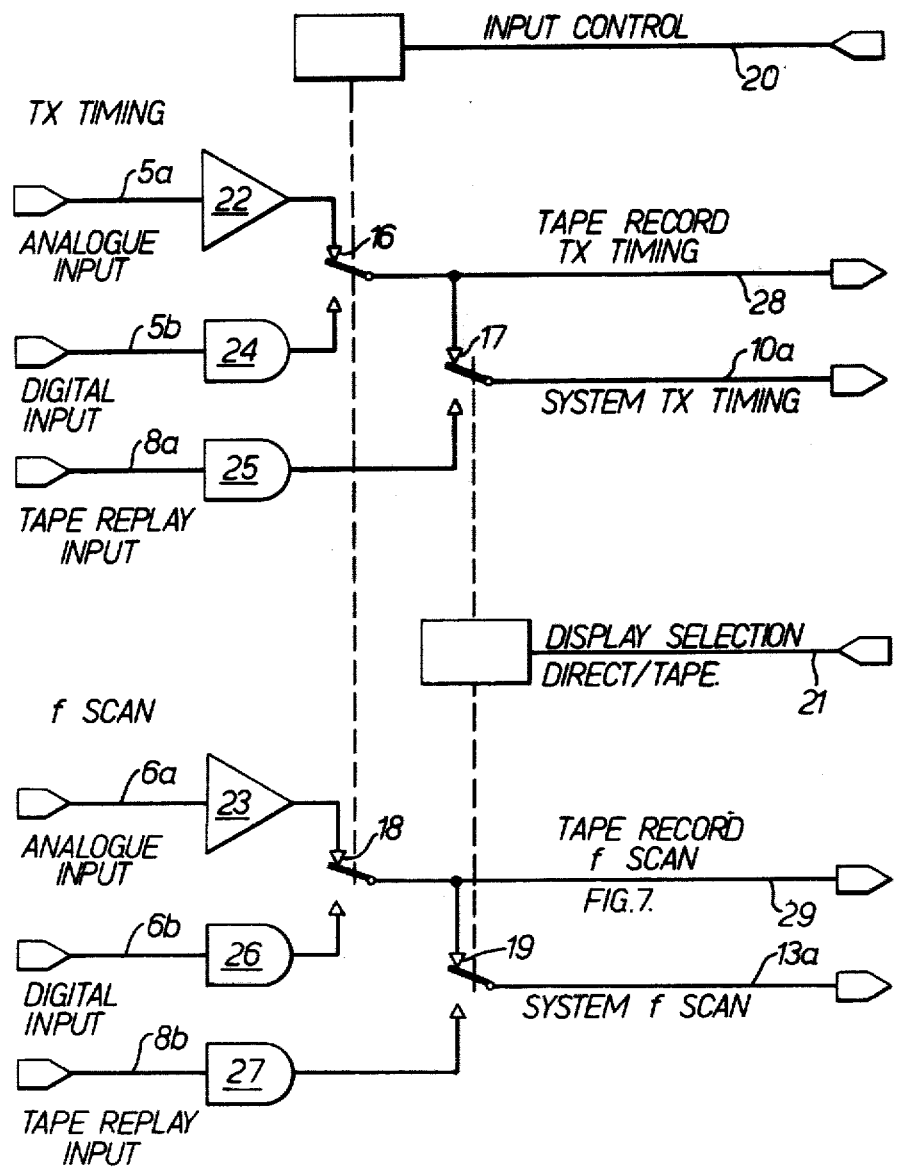
FIG. 4, is a block schematic diagram of a signal interface unit shown in FIG. 3.

A detailed diagram of the interface unit 7 is shown in FIG. 4, wherein parts corresponding to those shown in FIG. 3 bear the same numerical designations but are distinguished by an alphabetical suffix. The timing data fed from the parent sonar may be in analogue or digital form, or alternatively timing data may be provided by a tape recorder.

If analogue inputs relating to transmitted sonar pulses and scan signals are provided, they are fed from the parent sonar on lines 5a and 6a respectively. If digital data is provided, digital signals relating to transmitted sonar signals and scan signals are fed from the parent sonar on lines 5b and 6b respectively. If alternatively tape recorded sonar and scan signals are provided, these are fed on lines 8a and 8b from the tape recorder used. Switches 16, 17, 18 and 19, which are operated in response to signals on control input line 20, or display selection line 21 from the system process control unit 4, select the particular function required. Analogue input signals o the lines 6a and 5a are fed to the switches 16 and 18 respectively via analogue digital converters 22 and 23 respectively. Digital inputs on the lines 5b, 6b and 8a, 8b are fed via pulse shaping gates 24, 25, 26 and 27 to the switches 16, 18, 17 and 19 as appropriate. By suitable operation of the switches 16, 17, 18, 19 in response to signals on the lines 20 and 21, output signals for a tape recording can be provided on lies 28 and 29 or alternatively output signals for the system may be provided on lines 10a and 13a respectively. Transmission pulse timing signals on the line 10 FIG. 3, are fed to the range timing generator unit 12, the function of which is to synchronize the sonar data to the parent sonar, thereby to provide a range reference for the system.

In the majority of sonar applications it is not desirable to display the sonar returns for the complete transmit period. The generator 12 therefore generates a range timing signal determined in accordance with the range selected. This waveform determines the range sample period T1 and is shown in waveform 30 in FIG. 6. The range sample period T1 may be programmed to select either all of or part of the transmit period at increments of 10 yards and to facilitate this, the range timing generator 12 includes a clock providing an output waveform 31 as shown in FIG. 6.

Figure 5:
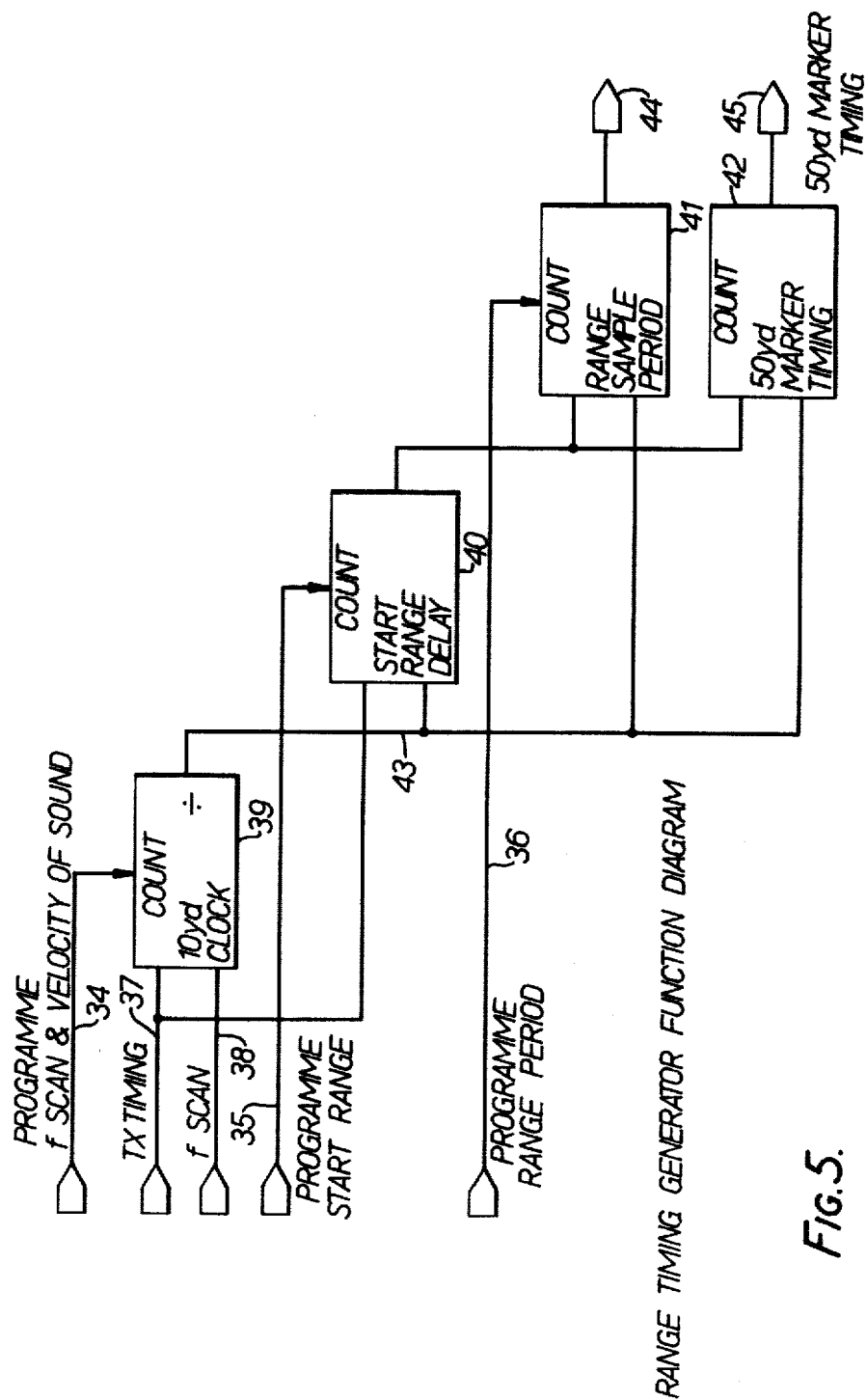
FIG. 5, is a block schematic diagram showing a range timing generator unit shown in FIG. 3.

Reference should now be made to FIG. 5 which is detailed block diagram of the range timing generator 12. Lines 34, 35 and 36 feed control data from the system process control unit 4 appertaining to velocity of sound in water, the start of the range delay period and the range period respectively as will now be described.

The transmitted transmission timing pulse 9, and the scan pulse are fed on lines 37 and 38 to unit 12. The unit 12 comprises four counters 39, 40, 41 and 42. The counter 39 is programmed to generate a ten yard clock signal, which in turn is employed as the clock for the other counters 40, 41 and 42. The counter 39 is enabled by transmitter transmission timing pulse signals on the line 37 and clocked by scan signals on the line 38 and programmed to scale the system timing for different scanning frequencies and also for range rate variations of velocity of sound in water, adjustment of the counter being effected by the signal on the line 34. The counter 40 is enabled by a transmitter timing pulse signal fed from line 37 and clocked by the ten yard clock fed thereto on line 43. The period of the counter is determined by the control signal on line 35 and it determines the range delay between transmission initiation and the start of the displayed range sample. The counter 41 is programmed by the range selection control signal fed on line 36 to generate the range sample period waveform 30 as shown in FIG. 6 which controls the associated functions related to displayed range period.

The counter 41 is enabled by start range delay signal fed from counter 40 and clocked by the ten yard clock signal on line 43. The counter 42 operates in parallel with the counter 41 to generate a 50 yard marker corresponding to timing waveform 33 as shown in FIG. 6. Thus two output waveforms are generated by the range timing generator 12, and these are the range sample period waveform 30 on line 44 and the 50 yard marker timing pulses, waveform 33 on line 45.

Figure 7:
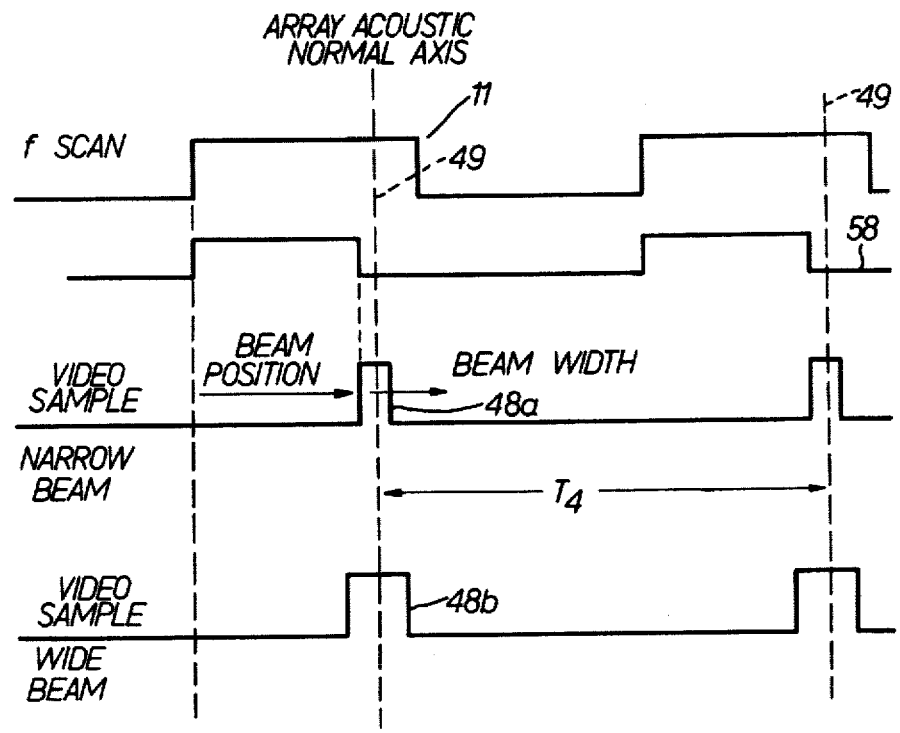
FIG. 7, is a waveform diagram showing waveforms; associated with a beam former timing unit shown in FIG. 3.
Figure 8:
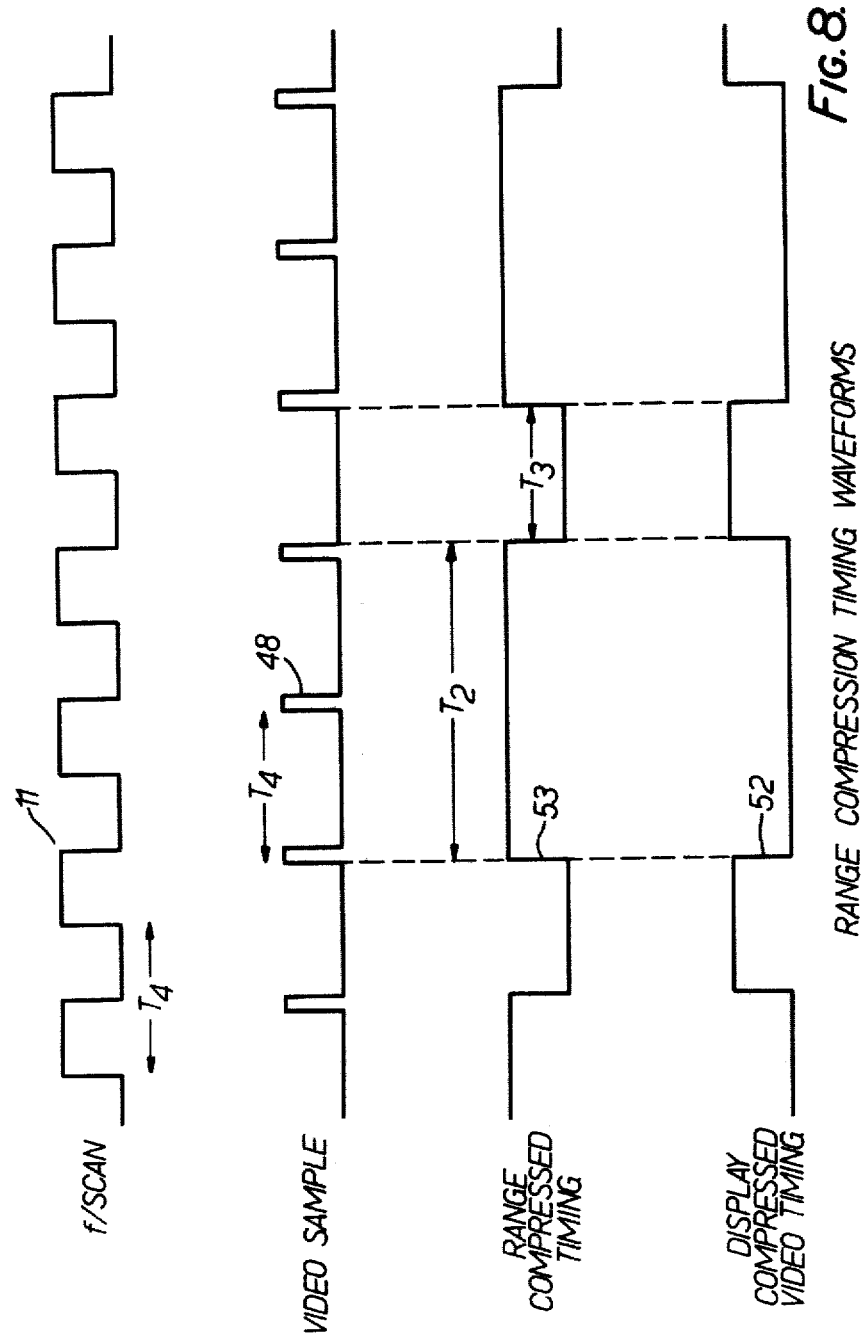
FIG. 8, is a waveform diagram showing range compression timing waveforms associated with the beam former timing unit shown in FIG. 3.
Figure 11:
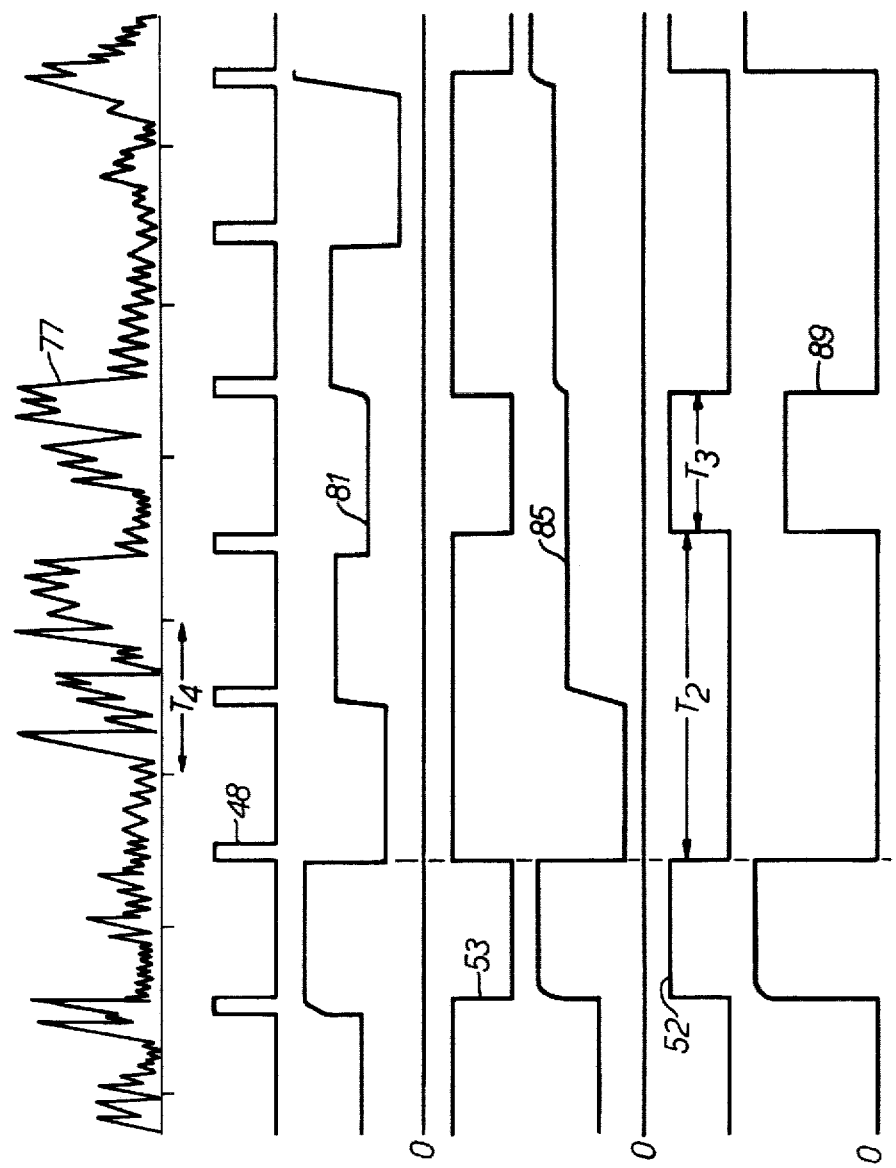
FIG. 11, is a waveform diagram showing timing waveforms associated with a video processor unit 46 shown in FIG. 3.

The range sample period waveform 30 is fed via line 44 to the beam former timing unit 15 which generates timing signals required by a video processor 46 to form the side scan beam. Firstly the beam former timing unit 15 generates on line 47 the video sampling signal 48 of period T4 as shown in FIGS. 8 and 11, two examples of which are waveforms 48a and 48b as shown in FIG. 7. The pulse period T4 of the signal 48 is aligned to be centered on the acoustic normal axis 49 of the scanning beam. The two waveforms 48a and 48b are typical for a narrow beam and wide beam respectively, the resultant acoustic beam width of the system depending upon the pulse period relative to the parameters of the present sonar.

The beam former timing unit 15 also generates on lines 50 and 51 range compression timing signal waveforms 52 and 53, as shown in FIGS. 8 and 11, which are complementary timing waveforms required to control a range compression function in the video processor. The complementary signal waveforms 52 and 53 are generated by scaling the video sampling signal 48 in accordance with the displayed range selected, so as to produce a waveform of 1200 compressed video pulses during the range sample period T1, FIG. 6. FIG. 8 shows the range compression timing waveforms 52 and 53 for a compression factor of 3, the largest of the video samples taken during a period T2 being displayed during a period T3 as will hereafter as explained. As the waveform 53 comprises a 1200 pulse count for each of the selected range scales it is employed as a timing signal for the following range related functions:

(a) Range scan time base generator.
(b) Marker generator.
(c) Test pattern generator.

Figure 9:
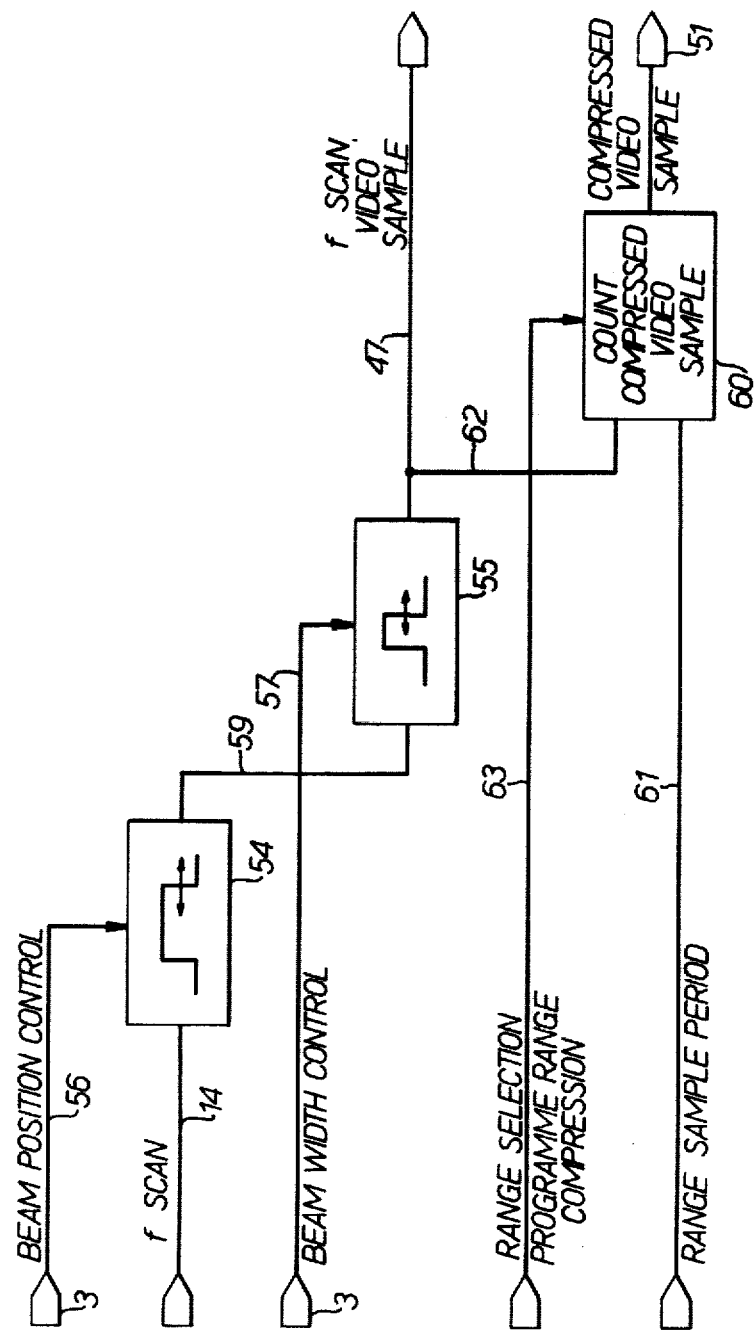
FIG. 9, is a generally schematic block diagram of a beam former unit shown in FIG. 3.

Operation of the beam former timing unit 15 will now be described with reference to FIG. 9. The video sample signal waveform 48 is generated by two programmable time delay circuits 54 and 55. The first of these delay circuits 54 is triggered by scan waveform 11 and controls the position of the beam within the scanned arc, in accordance with a beam position control signal applied on line 56. The second delay circuit 55 determines the beam width and is programmed to provide the variable beam width requirements of normal beam, wide beam and auto beam functions in accordance with a beam width control signal applied on line 57. Thus as shown in FIG. 7 waveform 58 is generated on line 59 at the output of delay circuit 54 and waveform 48a or 48b are generated on line 47 in accordance with the control signal on line 57. A counter 60 enabled by waveform 30 applied on line 61 and clocked by wavform 48 applied on line 62 is programmed in accordance with the range selected as indicated by a control signal on line 63 to generate the compressed video sample signal waveform 53 on line 51. The complementary waveform 52 is also provided although a line for this is not shown in FIG. 9.

Figure 10:
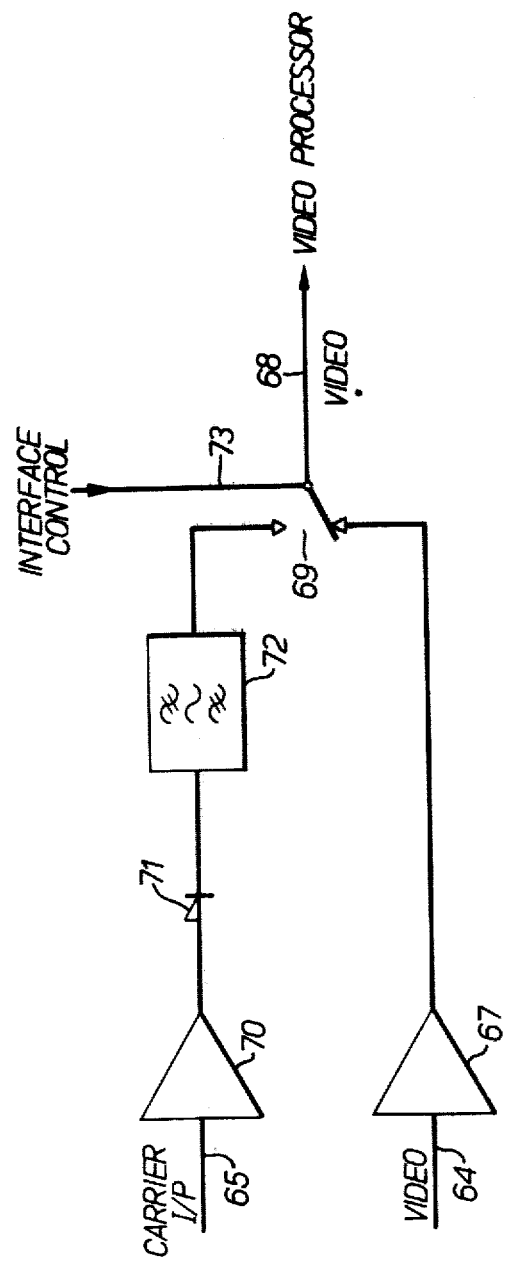
FIG. 10, is a generally schematic block diagram of a receiver signal interface unit shown in FIG. 3.

Video signals for the video processor 46 are received by the parent sonar. The SSPU accepts the sonar signal data either as detected video on line 64 or as a modulated carrier signal on line 65, as shown in FIG. 3 and FIG. 10. In the case of detected video inputs, a receiver signal interface unit 66 buffers the signal by means of amplifier 67, sets its amplitude to a suitable level for the video processor and applies it to the video processor on line 68 via switch 69. For modulated carrier inputs, the signal is buffered by means of an amplifier 70 detected in a detector 71 and filtered in a fiter 72, to produce an output signal which is fed via a switch 69 to the output line 68 for the video processor. Control of the switch 69 is effected by means of a signal on line 73 in accordance with the type of video signal fed from the parent sonar.

The video processor 46 will now be described which accepts signals from beam former unit 15 and the receiver interface unit 66. The function of the video processor is to extract sonar data from the scanning beam to produce the fixed side scan beam, the functional block diagram for the system being shown in FIG. 13.

Figure 13:
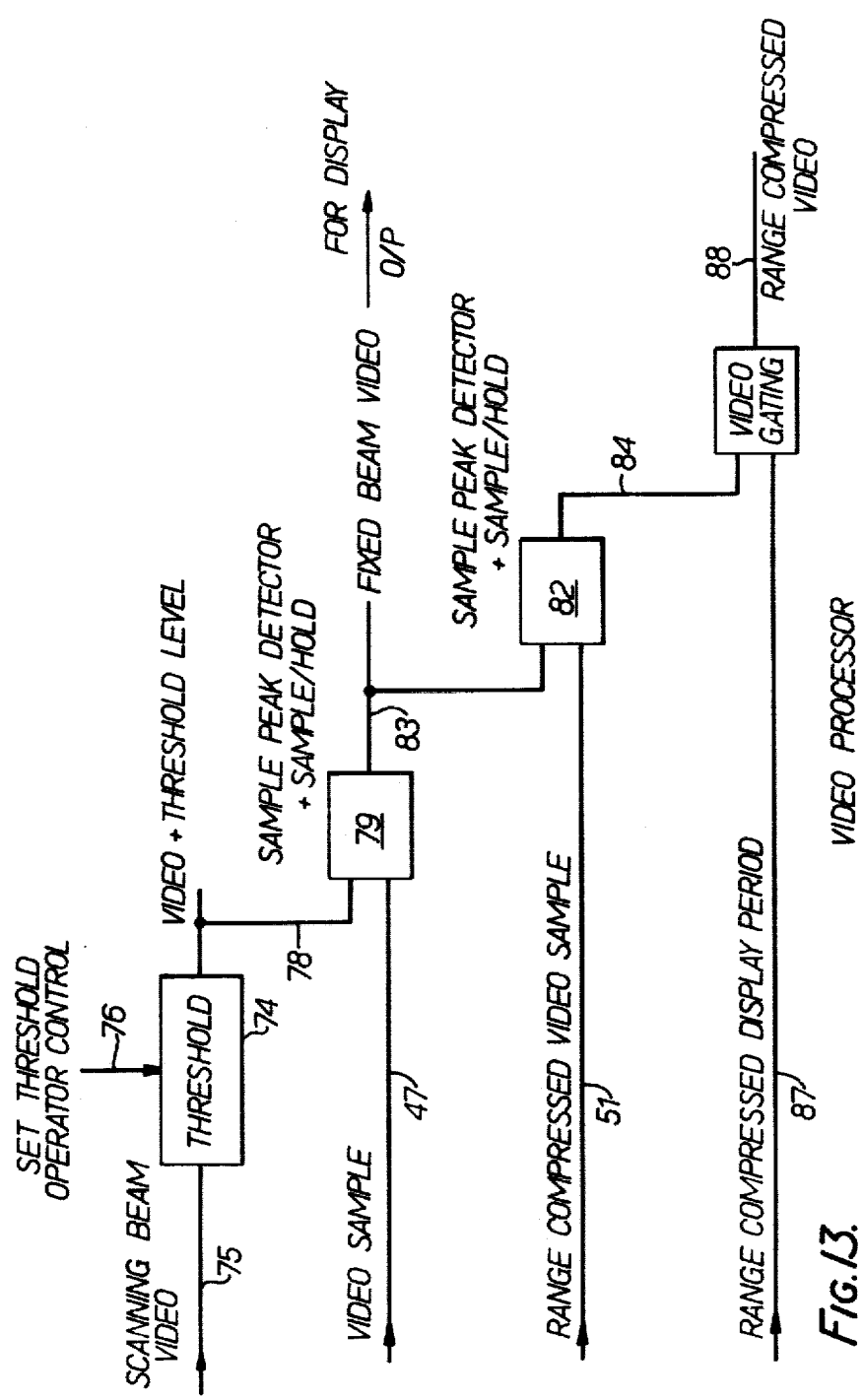
FIG. 13, is a generally schematic block diagram of a video processor unit forming part of the unit shown in FIG. 3.

The sonar video data is initially processed by a variable threshold circuit 74 which provides control of the background level to the recording system, video signals being fed thereto via line 75 from the interface unit 66 and control signals being fed thereto from unit 4 on line 76. The signal on line 75 corresponds to the waveform 77 FIG. 11. The output signal on line 78 is similar but has a threshold level added to it. This signal still in the form of a scanning beam of period T4 as shown in FIGS. 7, 8 and 13 is sampled by sampling detector 79. The detector 79 is gated by the video sample signal waveform 48 applied thereto on line 47 which detects the peak value of sonar signals in each sample period T4 thus producing the fixed beam of sonar data. A sample and hold circuit forming part of the detector 79 maintains the detected signal level for the duration of the scan period T4 until the next sample. The resultant signal becomes the scan sampled video for the display on line 83, waveform 81 FIG. 11, which is also applied to a further sampling detector 82 to range compress the video signal. This detector is gated by the range compression timing signal on line 51 waveform 53 to detect the largest signal in N samples where N is the compression ratio determined by the range selection. In the example given N is 3. A sample and hold circuit in detector 82 maintains the compressed signal for the display period to produce an output signal on line 84 corresponding to waveform 85 which is fed to sample circuit 86 to be sampled under control of waveform 52 fed on line 87 to provide a range compressed video signal on line 88 which corresponds to the waveform 89.

Signals on the lines 83 and 88 are fed to a summing amplifier and output interface unit 90 which facilitates the selection of any of the video signals to be displayed on a line scan recorder 91. The amplifier unit 90 interfaces the video, to drive via line 92, an intensity modulated input to the recorder 91.

Figure 12:
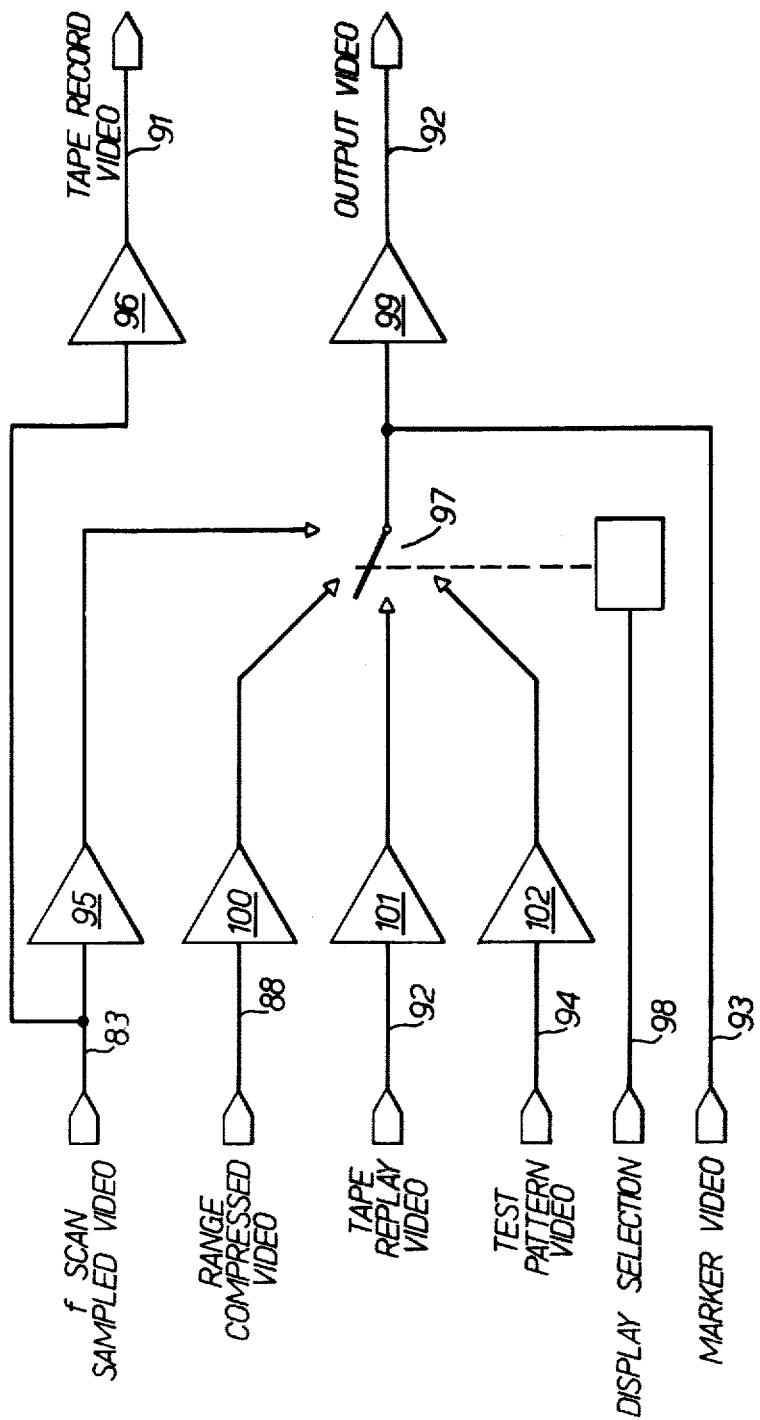
FIG. 12 is a block schematic diagram of a video summing and output interface unit forming part of the unit shown in FIG. 3.

FIG. 12 shows the interface unit in detail. A tape video input 92, a marker video input 93 and a test pattern input 94 are provided. The tape output for the recorder on line 91 if fed via amplifiers 95 and 96. Lines 88, 92 and 94 are fed to a switch 97, which operates under control of a signal on line 98 from the unit 4 to select the required video output on line 92. The signal fed to line 92, is amplified by amplifier 99 and intermediate stages of amplification are provided by amplifiers 100, 101, and 102.

Figure 14:
FIG. 14, is waveform diagram showing time base and test pattern waveforms associated with a range time base generator and a test pattern generator forming part of FIG. 3.

The line scan recorder used to produce the hard copy recordings has no internal horizontal scan generator. A time base generator 103 is therefore provided forming part of the system, to afford a range scan time base waveform for the recorder horizontal deflection and this is provided on line 104. A detailed diagram for the timebase generator, is not provided but the scan waveform is generated by a digital to analogue convertor which is clocked by the compressed video signal waveform 52 and enabled by the range sample waveform 30 which is fed thereto via lines 51 and 44 respectively. A buffer amplifier intefaces the scan signal to the horizontal deflection input on the recorder. FIG. 14 shows the scanned timebase waveform 107 on line 104, in relation to the transmitted pulse 9, the range sample pulse 30 and a test pattern signal 108, which is fed on line 94 from a test pattern generator 109. The test pattern generator 109 is an aid to the system alignment. The test pattern signal takes the form of a stepped ramp which when displayed produces 16 grey levels from white to black, the test signal being generated by a digital to analogue convertor (not shown) clocked by the compressed video signal waveform 52 on line 51 and enabled by a range sample waveform 30.

Figure 15:
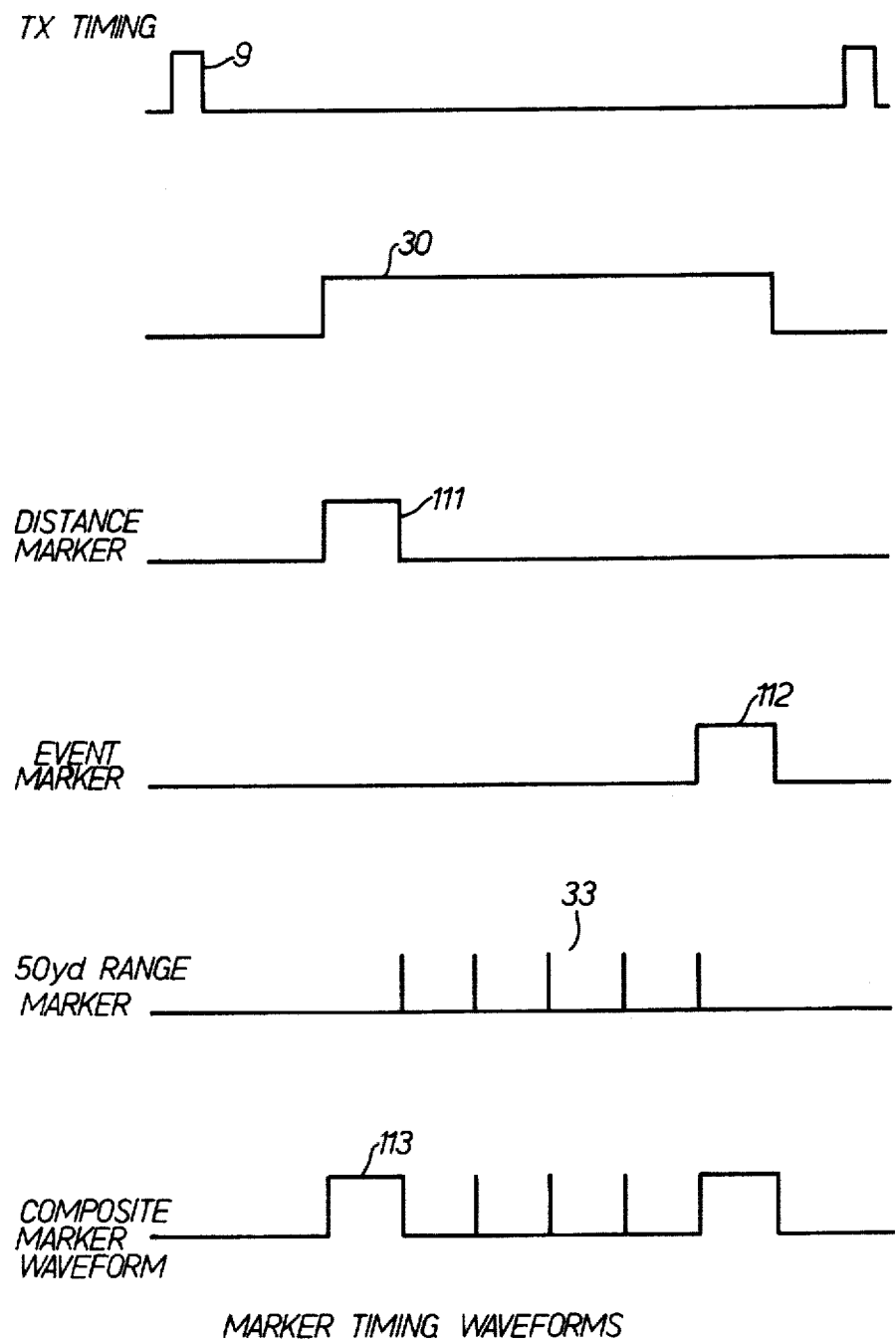
FIG. 15 is a waveform diagram showing timing waveforms associated with a marker generator unit forming part of the unit shown in FIG. 3.

Display markers are generated in a marker generator unit 110 as a timing waveform derived from the range timing signal waveform 30 and from the compressed video waveform 52 which are fed thereto on line 44 and 51 respectively. The marker waveforms, including the 50 yard marker waveform on line 45 are shown in FIG. 15, in relation to the transmission pulse waveform 9 and the range sampling period waveform 30 and comprise a distance marker 111, computed from the ships speed and generated every 100 yards, an event marker 112, and the 50 yard range marker waveform 33, which together produce a composite waveform 113 which is present on line 93. The composite waveform is mixed with the video signal to intensity modulate the recordings. Markers are selected for three functions, that is, 50 yard range lines, distance markers and target or event markers. The distance and event markers are generated from a timing counter (not shown) enabled by the range sampling period waveform 30 and clocked by range compressed sample waveform 53. These markers are summed together with the 50 yard marker waveform and each is selected for a display by operating controls in the unit 4.

The received signals from a parent sonar are sampled by the SSPU to form a fixed beam and procesed to match the display characteristics of recording systems for all variations in sonar conditions. In matching the video signals to the recording system it is necessary to consider the relationship between the video sampling range and the display resolution. To satisfy the range resolution requirements of scanning sonar systems, short pulse lengths and high sample rates are used. A total number of samples of video data therefore in a given range period greatly exceed the resolution of the display system. The effect of this is for the video samples to override the display resulting in a possible loss of low signal to noise sonar returns. The technique employed to resolve this problem, which has been just before described, is to range sample the fixed beam video samples to match the range resolution of the display. This is achieved by taking N samples of video data and displaying only the largest of these in a particular display cell where N is defined as the ratio of the total sum of video samples in the display range period to the total number of resolvable range points in the displaying system. Video compression is therefore variable as a function of the display range period which ensures that on each of the range scales the recorder is correctly matched for optimum performance. A signal threshold function als forms part of the signal processing system and this function controls the level of background signal that is presented on the display. As a variable function therefore, the signal threshold applied to the waveform 77 maybe set to optimize the display presentation to suit variations in sonar conditions for particular modes of operation.

The side scan data is presented as a hard copy recording on either dry silver paper or film from the line scan recorder 91, producing a sonar plot of sonar slant range against ship track giving distance. The received sonar data is processed to form video signals which are applied as intensity modulation to clock the sonar recording. The recorder paper speed is set to produce the optimum display resolution and pictorial presentation and ships speed is therefore scaled to paper speed to give distance travelled. Range scan is generated by the SSPU which is synchronized to the transmit timing of the parent sonar. The display range maybe selected either as the complete transmit cycle or as a selected range sample within the cycle. To aid geographical scaling, range markers at 50 yard intervals and at 100 yard intervals are generated as hereinbefore described to calibrate the sonar recordings.

What we claim is:

1. A side scan sonar system comprising a sonar transmitter transducer means for transmitting sonar signal pulses so as to produce an arc on insonification extending to one side of a line along the direction of forward motion of a ship, a line array of receiver transducers for receiving echo signals within the arc, an electronic scanning beamformer adapted to combine the signals of the transducers of the line array so as to form a directional receiving beam and to steer the said beam electronically through a scanning angle within the arc of insonification, sampling means arranged to receive the combined signals of the transducers, sampling control means synchronised with the transmitted pulses and operative to control the sampling means to select signals appertaining to a predetermined sector or strip within the scanning angle which signals provide information signals for visual display means.

2. A side scan sonar system as claimed in claim 1 wherein said scanning beamformer is arranged to steer said beam repeatedly through said scanning angle so that the array is repeatedly scanned electronically after each sonar pulse so as to provide data signals appertaining to the said sector or strip and so as to complete after the transmission of each sonar pulse a series of scans wherein successive scans relate to progressively increasing ranges, the sampling means being operative to sample echo signals received during a predetermined time slot in each scan, means for determining the bearing of received sonar echos in dependence upon the position of the time slots relative to the start of the scan, and means for determining the received sonar beam width in dependence upon the duration of the time slots thereby to provide information signals, received within the said sector, for visual display means.

3. A side scan sonar system as claimed in claim 1 or 2 wherein the sampling means is controlled by the sampling control means so as to provide for the visual display means signals which appertain to a parallel strip-like sector extending to one side of the ship.

4. A side scan sonar system as claimed in claim 1 or 2 wherein the sampling control means is arranged to be responsive to the ship's motion whereby the ship's motion is compensated for at least to some extent on the display provided by the display means.

5. A side scan sonar system as claimed in claim 2 where the time slots during which the sampling signal means are operative to sample received echo signals are arranged to be centred on an angular position in the scan arc which is common for each series of scans.

6. A side scan sonar system as claimed in claim 5 wherein the width of each time slot is arranged to vary during each series of scans so as to provide a predetermined effective receiver beam pattern.

7. A side scan sonar system as claimed in claim 2 wherein the width of each time slot is arranged to vary during each series of scans so as to provide an effective beam pattern of parallel strip-like form.

8. A side scan sonar system as claimed in claim 1 or 2 or 5 or 6 or 7 including visual display means in the form of a hard copy display unit in which data received during each scan is displayed as a line of greyscale along a range axis, one line for each scan, and in which movement in a direction orthogonal to the range axis of the substrate on which the display is provided is controlled in dependence upon the forward speed of the ship.

* * * * *